UNITED STATES PATENT OFFICE.

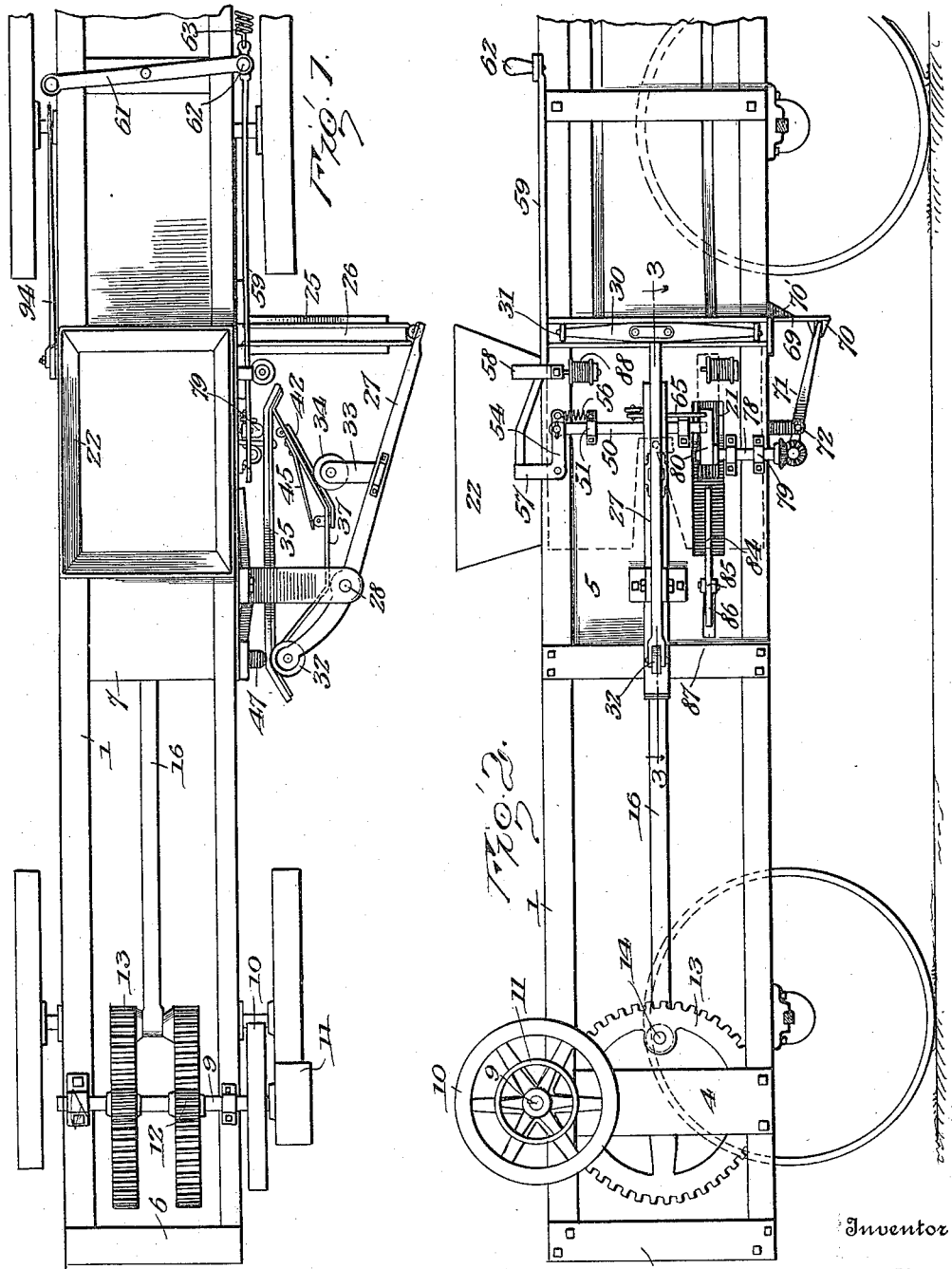

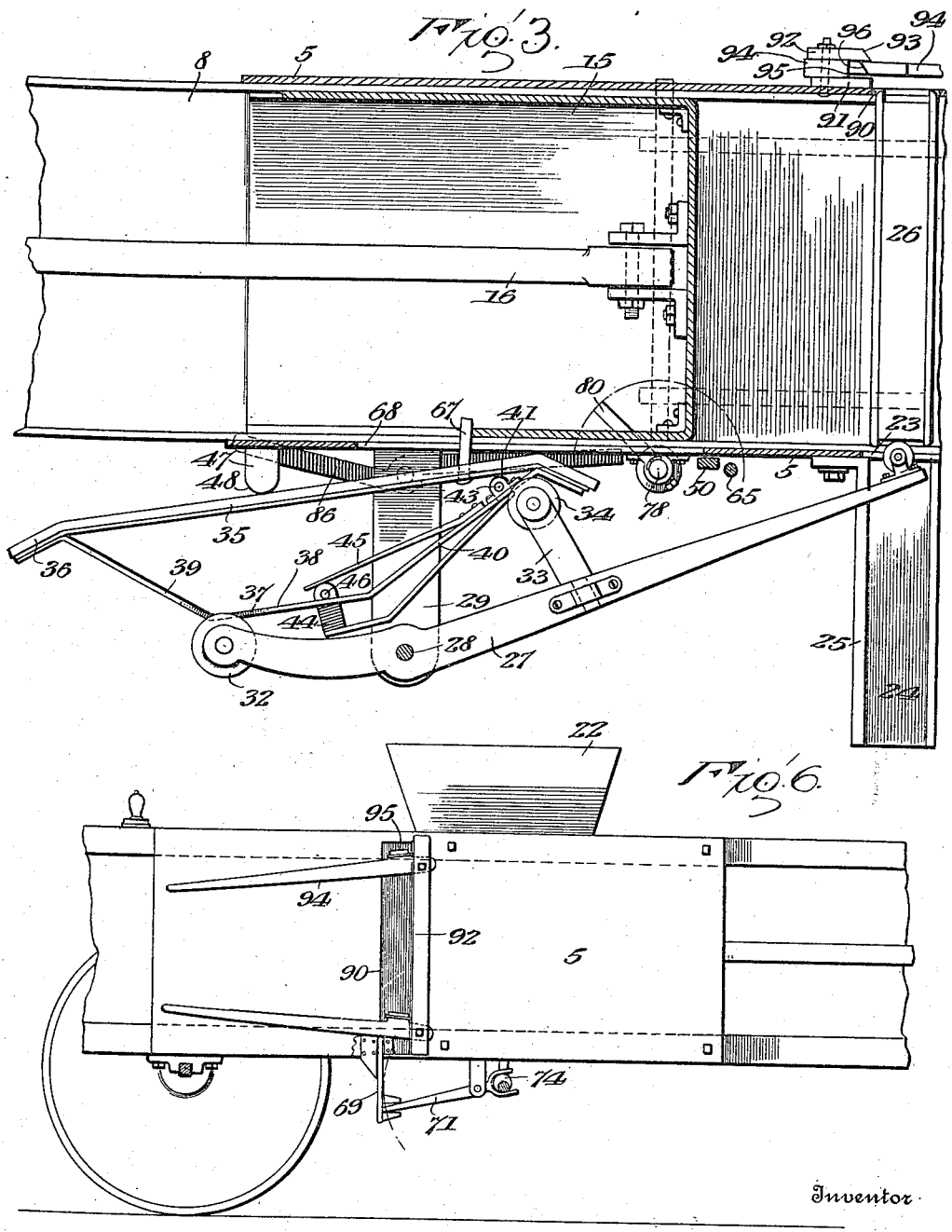

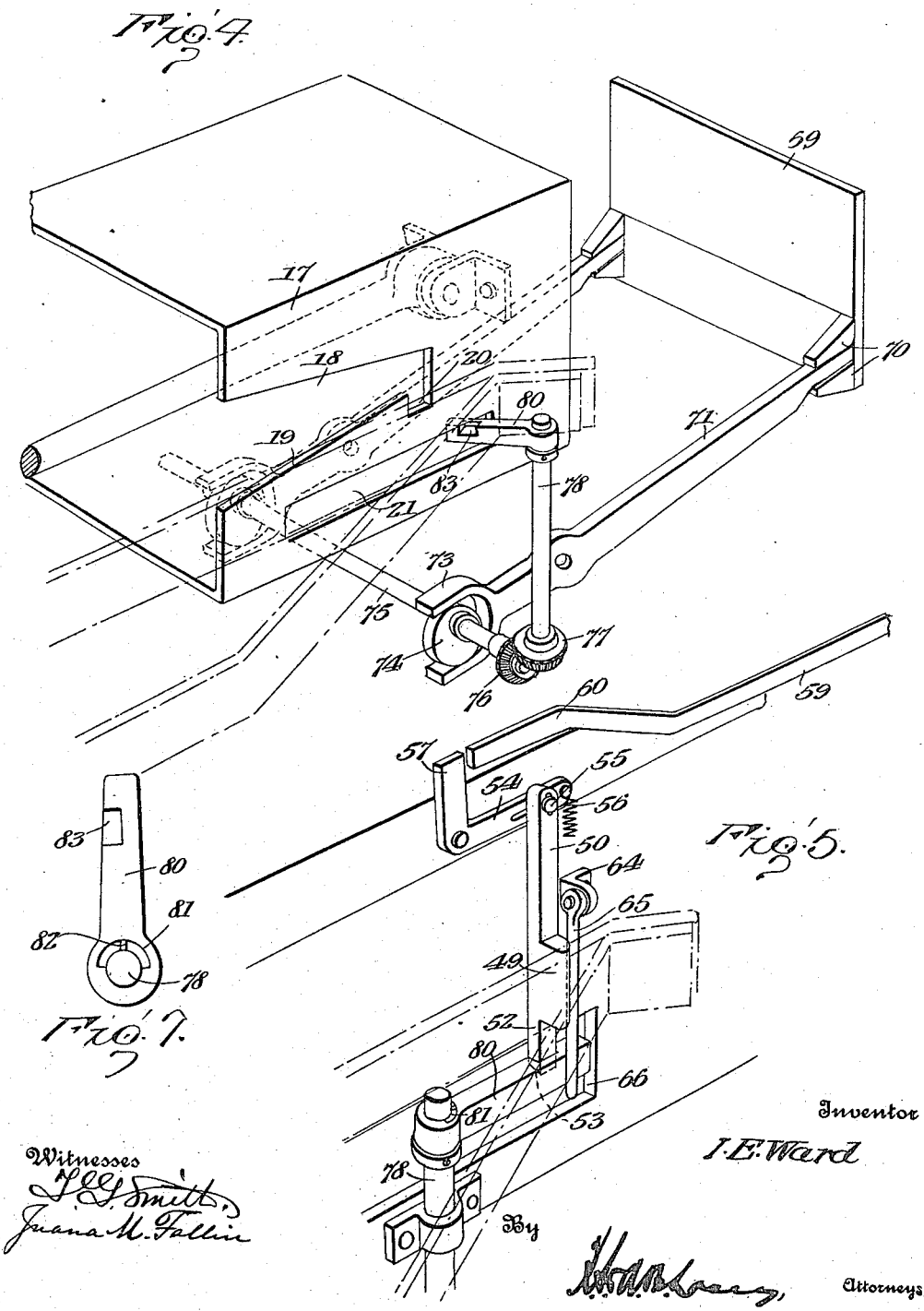

ISAAC E. WARD, OF ANDALE, KANSAS.

HAY-BALER.

1,170,470.  Specification of Letters Patent.  Patented Feb. 1, 1916.

Application filed February 17, 1914. Serial No. 819,254.

*To all whom it may concern:*

Be it known that I, ISAAC E. WARD, a resident of Andale, in the county of Sedgwick and State of Kansas, have invented certain new and useful Improvements in Hay-Balers; and I do hereby declare the following to be a full, clear, and exact description of the invention, such as will enable others skilled in the art to which it appertains to make and use the same.

This invention relates to baling presses and more particularly to that class in which division blocks are placed within the hay race or baling chamber in the process of forming the bales.

It is one aim of the invention to provide means for folding up the loose hay at the end of a completed bale, which means will serve also as a guide for the division block as the latter is moved to position in the baling chamber.

It is another aim of the invention to provide a baling press so constructed that the operation of folding up the end of a completed bale and the placing of the division block within the baling chamber will be performed automatically in a highly efficient manner and without any particular attention on the part of the operator of the press.

In the accompanying drawings: Figure 1 is a top plan view of the baling press embodying the present invention. Fig. 2 is a side elevation thereof. Fig. 3 is a horizontal sectional view, a portion of the mechanism being shown in top plan and the view being taken substantially on the line 3—3 of Fig. 2. Fig. 4 is a perspective view, illustrating a portion of the mechanism. Fig. 5 is a similar view, illustrating a portion of the mechanism. Fig. 6 is a side elevation, viewing that side of the press opposite the side shown in Fig. 2. Fig. 7 is a top plan view of the arm through the movement of which the mechanism for folding the end of a bale is actuated.

Corresponding and like parts are referred to in the following description and indicated in all the views of the accompanying drawings by the same reference characters.

In the drawings, the baling press is illustrated as including a wheel supported frame having upper angle iron frame bars 1 and similar lower bars or beams 2. The beams at each side of the frame are connected in spaced relation by bars 3, plates 4 and plates 5, which latter plates constitute the side walls of the baling chamber. The upper and lower beams are connected in spaced relation by means of bars 6 and plates 7 and 8 which constitute respectively the top and bottom of the said baling chamber. A shaft 9 is journaled in suitable bearings upon the upper beams 1 of the frame and upon this shaft is fixed a fly wheel 10 and a pulley 11. This shaft also has fixed upon it pinions 12 which mesh with spaced gears 13 connected by a crank pin 14.

The packer, is indicated in general by the numeral 15, and has pivoted to it a plunger rod 16 which is also connected to the crank pin 14, as clearly shown in Figs. 1 and 2 of the drawings. The packer 15 is preferably of hollow rectangular construction and for a purpose to be presently explained, one side wall of the packer, which wall is indicated specifically by the numeral 17, is formed with a recess 18 having a bottom wall 19 inclined from the rear edge of the said wall and terminating at a downwardly extending notch 20. Also for a purpose to be presently explained, the said wall of the packer is formed with a slot 21 which extends below the recess 18 and parallel to the lower side of the packer.

In order that hay may be introduced into the baling chamber, the chamber is provided in its top with the usual hopper 22. In order that a division block may be placed within the baling chamber, one side wall 5 of the said chamber is formed with an opening 23 and extending laterally from the bottom of the baling chamber at the lower end of the opening 23 is a supporting plate 24 upon which the lower end of the division block is to be disposed. The block is supported in upright position when placed upon the plate 24 by means of the guide arms 25 secured to the said side wall of the baling chamber and extending laterally therefrom and located at opposite sides of the said opening 23.

The baling block is indicated in general by the numeral 26. It will be understood that the block is to be disposed upon the supporting plate 24 in upright position and to be supported in this position by the arms 25, which will engage against the opposite faces of the block. As a means for moving the division blocks into the hay race, there is provided a rocking arm which is arranged for coöperation with the blocks for the purpose stated and which is actuated by a shiftable cam member, as will be presently explained. The arm above referred to is indicated by the numeral 27 and is pivotally mounted, as at 28, between bracket arms 29 which project laterally from the said side wall of the baling chamber. At one end the arm 27 supports a vertically disposed relatively narrow head 30 which carries rollers 31 adapted to engage against the outer lateral edge of a division block disposed upon the plate 24, in the manner shown in Figs. 1 and 3 of the drawings. The arm 27 at its opposite end is provided with a grooved roller 32 against which the cam member above referred to is designed to ride. In order that the cam member may properly coact with the arm, the arm is provided between its pivot and its end which carries the head 30, with a lateral extension 33 carrying a roller 34. The cam member above referred to is of frame-like structure, and includes a bar 35 which constitutes one side of the structure and which, for the greater portion of its length, is straight. The end portions of the bar, however, are bent at an obtuse angle, as indicated by the numeral 36. This cam member also includes in its structure a bar 37 which constitutes the other side of the said member and this bar 37 has a straight portion, indicated specifically by the numeral 38, which extends parallel to the bar 35 and further includes portions 39 and 40 which extend at obtuse angles to the portions 38 and which are secured to the angularly bent ends of the bar 38. The portion 40 of the bar 37 is formed with a slot which loosely receives an ear 41 located at one end of an arm 42. The ear 41 has a pin 43 fitted through it whereby to connect the ear pivotally with the said portion 40 of the bar 37. By reference to Figs. 1 and 3 of the drawings, it will be observed that the roller 32 is designed to ride against the portions 38 and 39 of the cam member and that the roller 34 is designed to ride against the arm 42.

In order that the cam member may be normally, yieldably forced toward the side of the baling chamber, upon which the mechanism above described is mounted, the arm 42 is provided at its free end with a relatively long finger 44 which works through a slot in the portion 38 of the cam member, and a leaf spring 45 is secured at one end to the portion 40 of the said cam member and bears at its other end against the end of the said finger 44 in a manner tending to force the arm 42 away from the side of the cam member. This movement is limited by means of a pin 46 which is fitted through the end of the finger 44 and which engages against the portion 38 when the parts are in the position shown in Fig. 3 of the drawings. The manner in which the arm 27 and the cam member coöperate will presently be more specifically pointed out.

As before stated, the spring 45 coöperating with arm 42 to force this arm against the roller 34 serves as a means for normally yieldably forcing the cam member in the direction of the baling chamber. Such movement of the cam member is normally resisted, however, by a fixed abutment and a movable detent, as will now be explained. The fixed abutment is indicated by the numeral 47 and is in the nature of a lug or block mounted upon the side wall of the baling chamber near the forward end thereof. This lug preferably has a rounded outwardly presented face 48 against which the bar 35 of the cam member may ride. The detent above referred to comprises a head 49 which is rounded in the same manner as the lug 47 and which is provided with a stem 50 which is slidably mounted in suitable bearings 51 upon the side wall of the baling chamber. The stem 50 of the detent projects not only above the head 49 but also below the same and this latter portion is indicated by the numeral 52 and is beveled at its extremity, as at 53. An angle lever is mounted for rocking movement upon the side of the baling chamber and one arm of this lever, indicated by the numeral 54, is pivotally connected, as at 55, with the upper end of the stem 50 of the detent. A spring 56 is connected to the end of the said arm 54 of the angle lever and to the side of the baling chamber or to one of the brackets 51 as shown in Fig. 2, and this spring normally yieldably holds the detent in lowered position. The other arm 57 of the angle lever projects substantially vertically. A bracket 58 is mounted upon the side of the baling chamber and working in this bracket is a bar 59 adapted to have longitudinal sliding movement in the bracket and also a slight vertical movement. The forward end portion of the bar 59 is slightly offset upwardly, as at 60, and is arranged to engage at its extremity against the upper end of the arm 57 of the angle lever when the bar 59 is shifted in a forward direction. In order that the bar may be so moved, a rocking actuating arm 61 is mounted upon the baling chamber at the rear end thereof and has pivotal connection with the rear end of the bar 59 and the said bar 61 carries at each end a handle 62, either of which handles may be grasped for the purpose of rocking the arm whereby to shift the bar 59. A spring 63 is connected to the rear end of the bar 59 and to the wall of the baling chamber and this spring serves to normally yieldably hold the said bar shifted rearwardly, and consequently out of engagement with the arm 57 of the angle lever.

By reference to Figs. 1 and 5 of the drawings, it will be observed that one end of the cam member, or, more specifically, the portion 35 thereof is adapted to normally rest against the head 49 of the detent. It will further be understood that when the rock arm 61 is rocked against the tension of the spring 63, the bar 59 will be shifted forwardly, thereby imparting rocking movement to the angle lever, which will result in the detent 50 being moved upwardly to position with its head 49 out of coöperative relation to the cam member. As the bar 59 is shifted in the manner stated, it will ride over the upper end of the angle lever and when this occurs, the spring 56 will act immediately to return the detent to lowered position. Also for a purpose to be presently explained, there is pivotally suspended from a bracket 64 mounted upon the side wall of the baling chamber, a striker 65, the striker depending beside the detent 50 and being so located that when the detent is elevated to allow the rear end of the cam member to be moved inwardly toward the said side wall of the baling chamber, the said end of the cam member will strike the striker 65 and sharply swing the lower end thereof in the direction of that wall of the baling chamber upon which it is mounted. The said wall of the baling chamber is formed with an opening 66 located directly opposite the opening 21 in the side of the packer. It will be apparent by reference to Figs. 2 and 5, that the lower end of the striker 65 is located directly opposite one end of the opening 66 so that when the striker is engaged by the cam member in the manner stated, its lower end will be swung a short distance into the baling chamber.

In the manner heretofore described, the arm 27 in its rocking movement is designed to move the block into the baling chamber and in order that the cam member may be shifted so as to cause such movement of the said arm, the member is provided with a laterally projecting pin 67 which, when the detent is moved out of position to coöperate with the cam member and the rear end of the arm 27 is forced laterally inwardly, is designed to be projected through an opening 68 in the side wall of the baling chamber and into the recess 18. Of course upon backward movement of the plunger 15, the pin 43 will first ride up the inclined wall 19 of this recess and will finally engage in the notch at the inner end of the recess and the continued backward movement of the plunger will result in the cam member being shifted forwardly from the position shown in Fig. 1 to the position shown in Fig. 3. In such movement of the cam member, that end of the arm 27 which carries the roller 32 will be carried outwardly and its opposite end will of course be forced inwardly, whereby to place the division block in the baling chamber, it being understood of course that one of the blocks has been previously disposed in proper position upon the supporting device provided therefor. Of course in the backward movement of the plunger, the pin 67 will be engaged by one wall of the notch 20 and in the advance or forward movement of the plunger, the pin will be engaged by the opposite wall of the said notch, so that in this latter movement of the plunger or packer, the cam member will be returned to the position shown in Fig. 1, or, in other words, to its normal position. It will be apparent that in this return movement of the cam member, the arm 42 thereof will ride against the roller 34 thereby moving this roller outwardly and returning the outer or rear end of the arm 27 to position for the engagement with another one of the division blocks.

As before stated, means is provided for folding up the loose material at the end of a completed bale prior to placing a division block into the baling chamber for the formation of another bale, and this means includes a folder plate 69 which is disposed against the guides 70 beneath the bottom of the baling chamber and in position for upward movement through the said bottom of the baling chamber for the purpose stated. The forwardly presented face of the folder plate 69 is provided at each side with a pair of spaced lugs 70 between which fit the rear ends of rock arms 71 which are mounted, as at 72, beneath the baling chamber. These arms at their forward ends are provided with yokes 73 receiving eccentrics 74 upon a shaft 75, which is also mounted beneath the bottom of the baling chamber. The shaft 75 has fixed upon it at one end a beveled gear 76 which meshes with a similar gear 77 at the lower end of a shaft 78 mounted in bearings 79 upon that side wall of the baling chamber upon which the previously described mechanism is mounted. An arm 80 is loosely mounted upon the upper end of the shaft 78 and is provided with an arcuate groove 81 concentric to the shaft and into which projects a pin 82 carried by the shaft, it being understood that the arm may, by reason of this construction, have limited free swinging movement upon the shaft. The arm 80 is formed in its upper side near its outer end with a seat 83, in which the lower beveled end 53 of the stem 50 is designed to engage when the detent is in position to restrain the cam member from inward movement. It will now be apparent that when the arm 80 is swung in a direction to rotate the shaft 78, corresponding movement will be imparted to the shaft 75 and the arms 71 will be swung upwardly at their rear ends, whereby to move the folder plate 69 into the baling chamber. In order that such operation of the parts may take place automatically upon backward movement of the plunger or packer, means is provided for throwing the arm 80 into the path of movement of the said packer or plunger, and this means is embodied in the striker 65 previously described.

For a purpose to be presently pointed out, an arm 84 is mounted for rocking movement, as indicated at 85, upon the side of the baling chamber and has an angularly disposed end portion 86 which projects through a slot 87 formed in the said side wall of the baling chamber, its other end being adapted, under conditions to be presently explained, to be projected through the opening 66.

Before proceeding to a description of the operation of the press, there will first be described means which is provided for manipulating the baling wires. The numeral 88 indicates the wire storage spools which are mounted upon that side wall of the baling chamber which has been previously referred to, and the wire from these spools is led across the interior of the baling chamber and through an opening 90 which is formed in the other side wall thereof. A plate 91 is secured in any suitable manner upon the last-mentioned side wall of the baling chamber and supported in spaced relation to this plate 91 is a cutter plate 92 having a beveled cutting edge 93. Levers 94 are pivoted at their ends between the plates 91 and 92 near the upper and lower ends thereof and each lever is formed adjacent its pivot with an upstanding blade 95 having a beveled cutting edge 96. By reference to Fig. 3 of the drawings, it will be observed that the edge of the blade 95 is designed to coöperate with the edge 93 of the cutter plate 92 and that the levers are slightly thickened at their beveled ends so as to provide a space 97 between the inner side of each lever and the adjacent portion of the plate 91, for the engagement of the bale wire, whereby the same will be firmly held after being cut. It will be observed, by reference to the said figure and to Fig. 6, that the blades 95 are located opposite the opening 90 and consequently opposite the recessed lateral edge of a division block in position within the baling chamber. By reason of this arrangement of the parts, the portions of the bale wire which will extend across the recessed edge of the block may be grasped and engaged over the blades 95, after which the levers may be swung upwardly, whereby to simultaneously cut and grip the said portions of the wires.

In the operation of the press, assuming the parts to be initially in the position shown in Fig. 1, one of the handles 62 is grasped and the bar 59 is shifted forwardly so as to swing the arm 54 of the angle lever in an upward direction, thereby lifting the detent to bring its head 49 out of engagement with the arm 27. The spring 45 will then immediately act to shift the cam member inwardly toward the baling chamber and as the cam member is moved in this manner, the rear end of its portion 35 will strike against the striker 65 and the lower end of the striker will sharply swing the arm 80 inwardly through the opening 66 and into the opening 21 in the side wall of the plunger or packer. Also in such movement of the cam member, the pin 67 will be projected through the opening 68 and into the recess 18. In the return stroke of the packer or plunger, the pin 67 will be guided by the inclined bottom wall 19 of the recess to position within the notch 20, and in the continued backward motion of the plunger, the cam member will be moved in the direction of the forward end of the press and simultaneously, the arm 80 will be swung in a corresponding direction, thereby imparting rotary motion to the shafts 78 and 75, which will result in the folder plates 69 being moved upwardly into the baling chamber. As the cam member is moved forwardly, its portion 39 will ride against the roller 32 and the arm 27 will be swung in such manner as to move the division block into the baling chamber, it being understood that one of these blocks has been previously placed in position upon the supporting plate 24 and between the guides 25. In the meantime, the spring 56 has returned the detent to its normal position. As the plunger or packer approaches the limit of its backward movement, its side wall will engage against the end 86 of the arm 84 and the opposite end of this arm will be swung sharply inwardly and through the opening 66, striking the arm 80 and swinging the same toward its original and normal position. Of course, as the arm 80 swings to the position shown in Fig. 5, it will ride beneath the beveled lower end of the stem of the detent and the detent will be momentarily moved upwardly and finally will drop to the position shown in the said figure and with the lower end of its stem seating in the seat 83 in the said arm. As the cam member is moved rearwardly, or, in other words, toward its normal position, its rear angular end 36 will ride against the head of the detent and the said cam member will be moved laterally outwardly, thereby withdrawing its pin 67 from engagement in the notch 30.

I claim—

1. In a baling press, a baling chamber, a packer working in said chamber, means at one side of the chamber for supporting a division block, a folder mounted for movement into the chamber in advance of the block, and means actuated by the movement of the packer for moving the folder and block into the chamber.

2. In a baling press, a baling chamber, a packer working in said chamber, means at one side of the chamber for supporting a division block, a folder plate mounted for movement into the chamber to lie transversely thereof and in such movement arranged to fold up the material of the bale at the end of the bale, the said folder plate constituting also a guide for said block as the block is moved into the chamber, and means arranged to move the folder into the chamber and to immediately subsequently move the block into the chamber.

3. In a baling press, a baling chamber, a packer working in said chamber, means for supporting a division block to be placed in said chamber, an arm mounted for rocking movement and arranged when rocked in one direction to move the division block into the baling chamber, a slidably mounted cam member arranged when slid in one direction to so rock the said arm, the packer having a notch provided with an inclined wall terminating in a shoulder, and means carried by the cam member and arranged to be brought into operative relation to the packer and to be guided by said inclined wall into engagement with said shoulder, whereby to connect the cam member for movement with the packer.

4. In a baling press, a baling chamber, a packer working in said chamber, means for supporting a division block to be placed in said chamber, an arm mounted for rocking movement and arranged when rocked in one direction to move the division block into the baling chamber, a slidably mounted cam member having spaced oppositely inclined surfaces, spaced elements upon said arm coöperating each with one of said surfaces, whereby when the cam member is slid in one direction, the said arm will be rocked to move the division block into the chamber and when the cam member is slid in the other direction, the arm will be returned to normal position, and means for moving the cam member.

5. In a baling press, a baling chamber, a packer working in said chamber, means for supporting a division block to be placed in said chamber, an arm mounted for rocking movement and arranged when rocked in one direction to move the division block into the baling chamber, a slidably mounted cam member having spaced oppositely inclined surfaces, spaced elements upon said arm coöperating each with one of said surfaces whereby when the cam member is slid in one direction, the said arm will be rocked to move the division block into the chamber and when the cam member is slid in the other direction the arm will be returned to normal position, the packer having a notch provided with an inclined wall terminating in a shoulder, and means carried by the cam member and arranged to be brought into operative relation to the packer and to be guided by said inclined wall into engagement with the said shoulder whereby to connect the cam member for movement with the packer.

6. In a baling press, a baling chamber, a packer working in said chamber, means for supporting a division block to be placed in said chamber, an arm mounted for rocking movement and arranged when rocked in one direction to move the division block into the said baling chamber, a cam member mounted for sliding movement and arranged when slid in one direction to so move the said arm, an abutment member carried by the said cam member, the cam member being movable into and out of position to bring its said abutment element into and out of coöperative relation to the packer, whereby when the said abutment element is in coöperative relation to the packer, the said cam member will be connected for movement with the packer, and coöperating means upon the cam member and arm tending to move the cam member into coöperative relation to the packer.

7. In a baling press, a baling chamber, a packer working in said chamber, means for supporting a division block to be placed in said chamber, an arm mounted for rocking movement and arranged when rocked in one direction to move the division block into the said baling chamber, a cam member mounted for sliding movement and arranged when slid in one direction to so move the said arm, an abutment member carried by the said cam member, the cam member being movable into and out of position to bring its said abutment element into and out of coöperative relation to the packer, whereby when the said abutment element is in coöperative relation to the packer, the said cam member will be connected for movement with the packer, and a spring-pressed member upon the cam member coöperating with the said arm and tending to move the cam member into coöperative relation to the packer.

8. In a baling press, a baling chamber, a packer working in said chamber, means for supporting a division block to be placed in said chamber, an arm mounted for rocking movement and arranged when rocked in one direction to move the division block into the said baling chamber, a cam member mounted for sliding movement and arranged when slid in one direction to so move the said arm, an abutment member carried by the said cam member, the cam member being movable into and out of position to bring its said abutment element into and out of coöperative relation to the packer whereby when the said abutment element is in coöperative relation to the packer the said cam member will be connected for movement with the packer, coöperating means upon the cam member and arm tending to move the cam member into coöperative relation to the packer, a detent normally restraining the cam member against such movement, and manually operable means for moving the detent out of active position.

9. In a baling press, a baling chamber, a packer working in said chamber, means for supporting a division block to be placed in said chamber, a member supported for movement into the baling chamber for folding the material of a bale, means for actuating the said member including a shaft, an arm carried by the shaft and arranged for movement into the path of movement of the packer and to be turned thereby, whereby to impart rotary movement to the shaft, means for moving the arm into the path of movement of the packer, and means for moving the division block into the baling chamber and for actuating the means for moving the said arm.

10. In a baling press, a baling chamber, a packer working in said chamber, means for supporting a division block to be placed in said chamber, a member supported for movement into the baling chamber for folding the material of a bale, means for actuating the said member including a shaft, an arm carried by the shaft and arranged for movement into the path of movement of the packer and to be turned thereby, whereby to impart rotary movement to the shaft, means for moving the arm into the path of movement of the packer, means for moving the division block into the baling chamber and for actuating the means for moving the said arm, and means actuated by the movement of the packer for returning the arm to normal position.

11. In a baling press, a baling chamber, a packer working in said chamber, means for supporting a division block to be placed in said chamber, a member mounted for movement into the chamber to fold the material at the end of a bail, means for moving the said folding member into the baling chamber including a rotatable shaft, an arm carried by the shaft and arranged upon movement in one direction to rotate the shaft and arranged for free movement independently of the shaft in the opposite direction, a striker for the arm arranged when actuated to move the arm in the first-mentioned direction and into the path of movement of the packer, whereby such movement of the arm will be completed through the movement of the packer, a slidably mounted cam member, means arranged for actuation by the cam member to move the division block into the baling chamber, the cam member being mounted for movement toward the packer and having means for coöperation with the packer whereby to be connected for movement therewith, means tending to so move the cam member, and a detent arranged to normally hold the cam member in inactive relation to the packer and to the striker.

12. In a baling press, a baling chamber, a packer working in said chamber, means for supporting a division block to be placed in said chamber, a member mounted for movement into the chamber to fold the material at the end of a bale, means for moving the said folding member into the baling chamber including a rotatable shaft, an arm carried by the shaft and arranged upon movement in one direction to rotate the shaft and arranged for free movement independently of the shaft in the opposite direction, a striker for the arm arranged when actuated to move the arm in the first-mentioned direction and into the path of movement of the packer whereby such movement of the arm will be completed through the movement of the packer, a slidably mounted cam member, means arranged for actuation by the cam member to move the division block into the baling chamber, the cam member being mounted for movement toward the packer and having means for coöperation with the packer whereby to be connected for movement therewith, means tending to so move the cam member, a detent arranged to normally hold the cam member in inactive relation to the packer and to the striker, and means actuated by the movement of the packer for returning the arm to normal position.

13. In a baling press, a baling chamber, a packer working in said chamber, means for supporting a division block to be placed in said chamber, a member mounted for movement into the chamber to fold the material at the end of a bale, means for moving the said folding member into the baling chamber including a rotatable shaft, an arm carried by the shaft and arranged upon movement in one direction to rotate the shaft and arranged for free movement independently of the shaft in the opposite direction, a striker for the arm arranged when actuated to move the arm in the first-mentioned direction and into the path of movement of the packer, whereby such movement of the arm will be completed through the movement of the packer, a slidably mounted cam member, means arranged for actuation by the cam member to move the division block into the baling chamber, the cam member being mounted for movement toward the packer and having means for coöperation with the packer whereby to be connected for movement therewith, means tending to so move the cam member, a detent arranged to normally hold the cam member in inactive relation to the packer and to the striker, and coöperating means upon the arm and detent for restraining the arm against movement in the first-mentioned direction until the detent has been moved in a direction to permit of the movement of the cam member into coöperative relation to the packer.

14. In a baling press, a baling chamber, a packer working in said chamber, means for supporting a division block to be placed within the chamber, an arm mounted for rocking movement and arranged, when rocked in one direction, to move the division block into the chamber, a slidably mounted cam member arranged for actuation upon the said arm, the said cam member being movable into coöperative relation to the packer whereby to be connected for movement therewith, a detent normally restraining the cam member against such movement, an arm connected with the detent, a bar mounted for sliding movement and arranged to coöperate with the arm whereby, upon movement of the bar, the arm will be rocked to move the detent out of position to restrain the cam member, the said bar being arranged to disengage from the said arm when the arm has been so moved, and means whereby the bar may be moved.

15. In a baling press, a baling chamber, a packer working in said chamber, means for supporting a division block to be placed within the chamber, an arm mounted for rocking movement and arranged, when rocked in one direction, to move the division block into the chamber, a slidably mounted cam member arranged for actuation of the said arm, the said cam member being movable into coöperative relation to the packer whereby to be connected for movement therewith, a detent normally restraining the cam member against such movement, an arm connected with the detent, a bar mounted for sliding movement and arranged to coöperate with the arm whereby, upon movement of the bar, the arm will be rocked to move the detent out of position to restrain the cam member, the said bar being arranged to disengage from the said arm when the arm has been so moved, means whereby the bar may be moved, and means for returning the bar to normal position.

In testimony whereof, I have signed this specification in the presence of two subscribing witnesses.

ISAAC E. WARD.

Witnesses:
  W. Brown,
  D. C. McKinsey.

Copies of this patent may be obtained for five cents each, by addressing the "Commissioner of Patents, Washington, D. C."